United States Patent
Scudder et al.

(10) Patent No.: US 6,400,040 B1
(45) Date of Patent: Jun. 4, 2002

(54) VEHICLE IGNITION AND REMOTE KEYLESS ENTRY ASSEMBLY

(75) Inventors: William H. Scudder, Ferndale; Douglas L. Campbell, Northville; Tom Tang, Novi; Riad Ghabra, Dearborn Heights; Ronald O. King, Brownstown; John Nantz, Brighton; Sandyha Renuka, Novi, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/519,400

(22) Filed: Mar. 3, 2000

(51) Int. Cl.[7] ............................................... H01H 47/22
(52) U.S. Cl. ...................... 307/10.2; 307/9.1; 307/10.3; 307/10.6; 180/287; 340/425.5; 340/426
(58) Field of Search .................................. 309/9.1, 10.2, 309/10.3, 10.6; 180/287; 340/425.5, 426

(56) References Cited

U.S. PATENT DOCUMENTS

| | | | |
|---|---|---|---|
| 5,616,966 A | 4/1997 | Fischer et al. | |
| 5,723,911 A | 3/1998 | Glehr | |
| 5,724,028 A | 3/1998 | Prokup | |
| 5,729,057 A | * 3/1998 | Frenzel et al. | 307/10.3 |
| 5,763,958 A | * 6/1998 | Yamamoto et al. | 307/10.5 |
| 5,804,888 A | 9/1998 | Murr et al. | |
| 5,818,330 A | 10/1998 | Schweiger | |
| 5,869,908 A | * 2/1999 | Moczyemba et al. | 307/10.5 |
| 5,889,471 A | 3/1999 | Glehr et al. | |
| 5,905,444 A | 5/1999 | Zimmer | |

* cited by examiner

Primary Examiner—Stephen W. Jackson
Assistant Examiner—Robert L. Deberadinis
(74) Attorney, Agent, or Firm—Brooks & Kushman P.C.

(57) ABSTRACT

A vehicle ignition and remote keyless entry (RKE) assembly includes a key with an RKE transmitter and a first immobilizer coil. A key cylinder is configured to receive the key. A housing receives the key cylinder. A lightpipe is also received within the housing. An actuator is engageable with the key for connecting the key to a circuit board assembly. An RKE antenna insert molded into the housing or the lightpipe. A second immobilizer coil is insert molded into the housing or the lightpipe.

16 Claims, 1 Drawing Sheet

VEHICLE IGNITION AND REMOTE KEYLESS ENTRY ASSEMBLY

TECHNICAL FIELD

The present invention relates to a vehicle ignition and remote keyless entry assembly which includes a first immobilizer coil and RKE transmitter in a key body, and a second immobilizer coil and RKE antenna insert molded into one of a plurality of ignition assembly components.

BACKGROUND ART

Modern vehicle designs are sometimes provided with an ignition immobilizer to eliminate the need for a profiled key and lock cylinder in the ignition assembly. The immobilizer typically includes a first immobilizer coil positioned in a key FOB. The first immobilizer coil communicates with a second immobilizer coil which is attached to the ignition assembly, and typically includes its own circuit board. The second immobilizer coil is operative to electronically disable the ignition assembly, and is an extra component which adds assembly costs, and requires additional wiring and packaging space.

Modern vehicles also often include remote keyless entry systems, including a remote keyless entry (RKE) transmitter positioned in a key FOB for communication with an antenna in the vehicle. The antenna is typically positioned on a circuit board and communicates with an electronic vehicle locking and unlocking system for locking and unlocking the vehicle doors. A problem with these designs is that the antenna is an extra component which must be assembled somewhere in the vehicle in communication with a circuit board for operation of the door locks. If the antenna is held on a circuit board, packaging space on the circuit board may limit its size, and its robustness may be limited.

Accordingly, it is desirable to provide an improved vehicle ignition/remote keyless entry immobilizer assembly in which part count is reduced and a robust assembly is provided.

DISCLOSURE OF INVENTION

The present invention overcomes the above-referenced shortcomings of prior art vehicle ignition assemblies by providing a vehicle ignition/RKE/immobilizer assembly in which an immobilizer coil and RKE antenna are insert molded into plastic ignition assembly components to reduce part count and improve robustness of the assembly.

More specifically, the present invention provides a vehicle ignition and remote keyless entry (RKE) assembly including a key assembly with a key, an RKE transmitter and a first immobilizer coil. A key cylinder is configured to receive the key, and the key cylinder is received within a housing. A lightpipe is also received within the housing. An actuator is engageable with the key for connecting the key to a circuit board assembly. An RKE antenna is insert molded into the housing or the lightpipe, or on a back cover. A second immobilizer coil is insert molded into the housing or the lightpipe as well. The integration of electronics between the ignition, RKE and immobilizer removes redundant components when adapted to specific smart systems.

The RKE transmitter may be enclosed within a key body or within a key FOB attached to the key.

Accordingly, an object of the invention is to provide an improved vehicle ignition assembly wherein an immobilizer coil and RKE antenna are insert molded into existing ignition assembly components for reduced part count and improved robustness of the assembly.

The above objects and other objects, features, and advantages of the present invention are readily apparent from the following detailed description of the best mode for carrying out the invention when taken in connection with the accompanying drawing.

DETAILED DESCRIPTION OF THE PREFERRED EMBODIMENT

Figure 1:
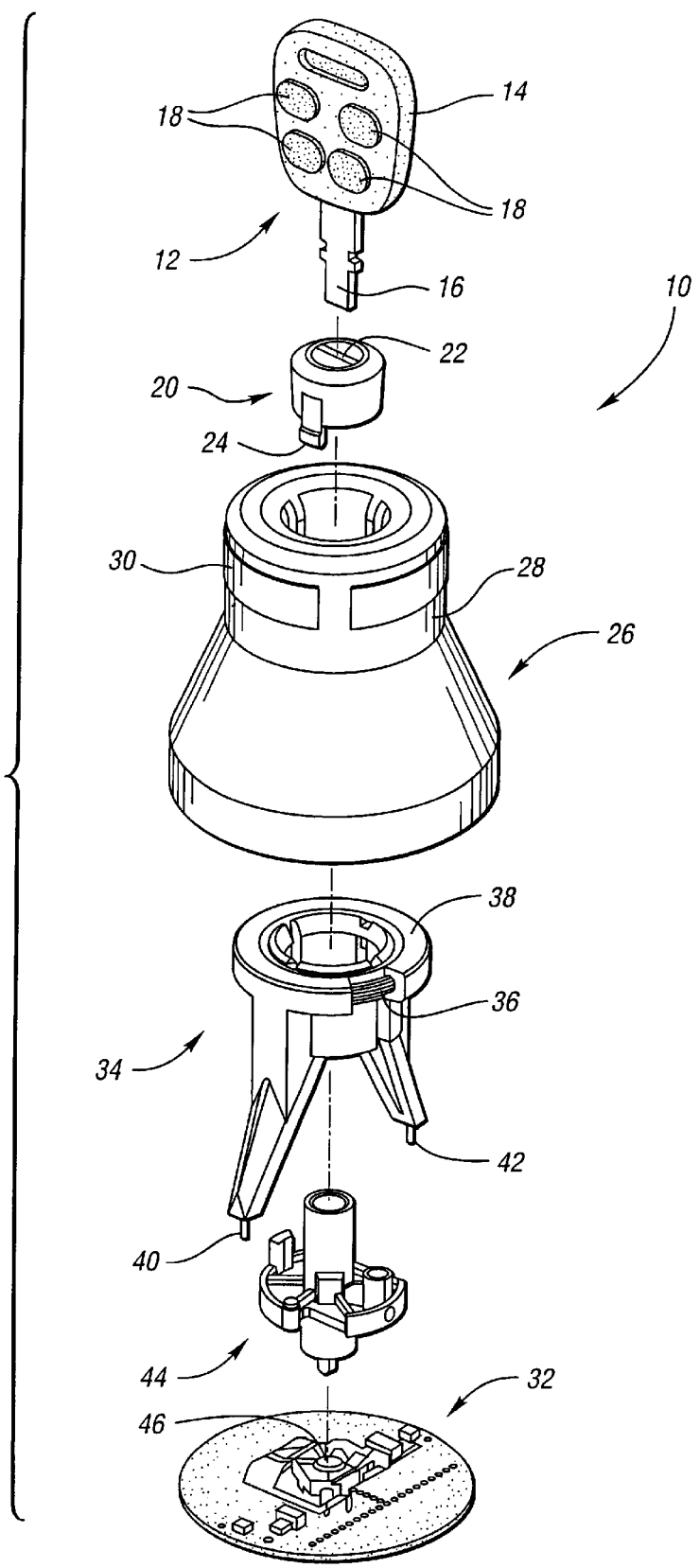
FIG. 1 shows an exploded perspective view of a vehicle ignition/immobilizer/remote keyless entry (RKE) assembly in accordance with the present invention.

The present invention will be described in a preferred embodiment with reference to FIG. 1. The present invention contemplates that various obvious modifications could be made by one of ordinary skill in the art without departing from the scope of the invention described herein.

In the embodiment shown in FIG. 1, the vehicle ignition/remote keyless entry (RKE)/immobilizer assembly 10 is shown in an exploded view. In this embodiment, the key assembly 12 includes a key body 14 with a metal key 16 extending therefrom. The key body 14 includes various buttons 18 for providing door lock and unlock functions, panic button, etc.

Housed within the key body 14 are a first immobilizer coil and an RKE transmitter (not shown). Also housed within the key body 14 are a battery and circuit board. Alternatively, the RKE transmitter may be housed within a corresponding key FOB. Additionally, the RKE transmitter could be eliminated in this assembly.

A key cylinder 20 is provided with a slot 22 for receiving the metal key 16, and includes tabs 24 which are operative to limit rotational movement of the key 16 and key cylinder 20 with respect to the vehicle.

The key cylinder 20 is received within a plastic housing 26. The plastic housing 26 includes a cylindrical portion 28 within which an RKE antenna 30 is insert molded. By insert molding the RKE antenna within the plastic housing 26, the antenna 30 is properly located for receiving transmitted signals, and is robust in that it is protected by the plastic housing Also, by insert-molding the RKE antenna 30 into the plastic housing 26, it may be larger than in prior art designs, which may improve operability. The RKE antenna 30 receives signals from the RKE transmitter in the key body 14 for actuating door lock/unlock functions remotely of the vehicle.

The RKE antenna 30 is electrically connected to RKE circuitry on the circuit board assembly 32.

A lightpipe 34 is received within the housing 26, and comprises a clear material, such as acrylic or Lexan. Accordingly, light shined into the lightpipe 34 illuminates the ignition assembly for improved visibility in a dark vehicle. As shown, a second immobilizer coil 36 is insert molded within an upper ring 38 of the lightpipe 34.

By insert molding the second immobilizer coil 36 into the lightpipe 34, the robustness of the second immobilizer coil 36 is enhanced because it is protected by the lightpipe 34, and the assembly process is simplified because the second immobilizer coil 36 is integral with the lightpipe 34 and therefore installed therewith. As shown, lead wires 40, 42 are provided for electrically interconnecting the second immobilizer coil 36 with immobilizer circuitry on the circuit board assembly 32.

An actuator 44 is provided as an interface between the metal key 16 and the ignition switch 46 on the circuit board 32.

The present invention contemplates various component combinations within the scope of the invention. For example, the RKE antenna could be housed on the circuit board, or could be insert molded into the ignition housing 26 or lightpipe 34. Also, the second immobilizer coil 36 could be insert molded into the ignition housing 26 or the lightpipe 34. Any combination of these options is possible.

An advantage of using the immobilizer assembly is that the key-in circuit (i.e. chime switch) can be eliminated because the immobilizer system recognizes whether or not the key is engaged in the slot 22. The immobilizer system eliminates the need for a profiled key and lock cylinder.

While the best mode for carrying out the invention has been described in detail, those familiar with the art to which this invention relates will recognize various alternative designs and embodiments for practicing the invention within the scope of the appended claims.

What is claimed is:

1. A vehicle ignition and remote keyless entry (RKE) assembly comprising:
   a key including an RKE transmitter and a first immobilizer coil enclosed within a key body;
   a key cylinder configured to receive the key;
   a housing receiving the key cylinder;
   a lightpipe housed within the housing;
   an actuator engageable with the key for connecting the key to a circuit board assembly;
   an RKE antenna insert molded into one of the housing and lightpipe; and
   a second immobilizer coil insert molded into one of the housing and lightpipe.

2. The vehicle ignition and RKE assembly of claim 1, wherein said antenna and said second immobilizer coil are electrically connected with the circuit board assembly.

3. The vehicle ignition and RKE assembly of claim 1, wherein said lightpipe comprises an upper ring, and said second immobilizer coil is insert molded into the upper ring.

4. The vehicle ignition and RKE assembly of claim 1, wherein said housing includes a cylindrical portion and said RKE antenna is insert molded in the cylindrical portion.

5. The vehicle ignition and RKE assembly of claim 2, wherein said circuit board assembly includes ignition switch circuitry, RKE circuitry and immobilizer circuitry.

6. A vehicle ignition and remote keyless entry (RKE) assembly comprising:
   a key including an RKE transmitter enclosed within a key body;
   a key cylinder configured to receive the key;
   a housing receiving the key cylinder;
   a lightpipe housed within the housing;
   an actuator connecting the key to a circuit board assembly;
   an RKE antenna insert molded into one of the housing and lightpipe.

7. The vehicle ignition and RKE assembly of claim 6, wherein said antenna is electrically connected with the circuit board assembly.

8. The vehicle ignition and RKE assembly of claim 6, wherein said housing includes a cylindrical portion and said RKE antenna is insert molded in the cylindrical portion.

9. The vehicle ignition and RKE assembly of claim 7, wherein said circuit board assembly includes ignition switch circuitry and RKE circuitry.

10. The vehicle ignition and RKE assembly of claim 6, further comprising a first immobilizer coil enclosed within the key body and a second immobilizer coil insert molded into one of the housing and lightpipe.

11. A vehicle ignition assembly comprising:
    a key including a first immobilizer coil enclosed within a key body;
    a key cylinder configured to receive the key;
    a housing receiving the key cylinder;
    an actuator operative to connect the key to a circuit board assembly; and
    a second immobilizer coil insert molded into the housing.

12. The vehicle ignition assembly of claim 11, wherein said second immobilizer coil is electrically connected with the circuit board assembly.

13. The vehicle ignition assembly of claim 11, wherein said circuit board assembly includes ignition switch circuitry and immobilizer circuitry.

14. The vehicle ignition assembly of claim 11, further comprising an RKE transmitter enclosed within the key body and an RKE antenna insert molded into the housing.

15. A vehicle ignition and remote keyless entry (RKE) assembly comprising:
    a key assembly including a key, an RKE transmitter, and a first immobilizer coil;
    a housing configured to receive the key;
    a lightpipe housed within the housing;
    an actuator operative to connect the key to a circuit board assembly;
    an RKE antenna insert molded into one of the housing and lightpipe; and
    a second immobilizer coil insert molded into one of the housing and lightpipe.

16. The vehicle ignition and RKE assembly of claim 15, wherein said key assembly comprises a key with a key body enclosing the RKE transmitter and first immobilizer coil.

* * * * *

UNITED STATES PATENT AND TRADEMARK OFFICE
CERTIFICATE OF CORRECTION

PATENT NO.  : 6,400,040 B1
DATED       : June 4, 2002
INVENTOR(S) : William H. Scudder et al.

It is certified that error appears in the above-identified patent and that said Letters Patent is hereby corrected as shown below:

<u>Title page,</u>
Item [75], Inventors, the last inventor's first name is misspelled. The correct spelling should be: -- Sandhya Renuka --

Signed and Sealed this

Fifteenth Day of October, 2002

*Attest:*

*Attesting Officer*

JAMES E. ROGAN
*Director of the United States Patent and Trademark Office*